United States Patent [19]

Sawanobori

[11] Patent Number: 5,777,508
[45] Date of Patent: Jul. 7, 1998

[54] VOLTAGE CONTROLLER FOR CONTROLLING SOLID-STATE IMAGE SENSOR

[75] Inventor: Keiji Sawanobori, Itabashi-ku, Japan

[73] Assignee: Asahi Kogaku Kogyo Kabushiki Kaisha, Tokyo, Japan

[21] Appl. No.: 743,133

[22] Filed: Nov. 4, 1996

Related U.S. Application Data

[63] Continuation of Ser. No. 480,328, Jun. 7, 1995, abandoned.

[30] Foreign Application Priority Data

Jun. 10, 1994 [JP] Japan .................... 6-152896

[51] Int. Cl.$^6$ .................................... G05F 1/10
[52] U.S. Cl. .................... 327/534; 358/482; 358/483; 348/311; 348/312; 250/208.1
[58] Field of Search .................... 348/294, 311, 348/312, 314; 358/482, 483; 250/208.1; 327/534

[56] References Cited

U.S. PATENT DOCUMENTS

| | | | |
|---|---|---|---|
| 4,845,568 | 7/1989 | Hieda et al. | 358/213.31 |
| 5,036,397 | 7/1991 | Nagabusa | 358/213.26 |
| 5,095,226 | 3/1992 | Tani | 307/296.1 |
| 5,282,041 | 1/1994 | Tani et al. | 358/213.19 |
| 5,350,995 | 9/1994 | Iketani | 320/15 |
| 5,469,484 | 11/1995 | Sato et al. | 377/58 |

Primary Examiner—Timothy P. Callahan
Assistant Examiner—Jung Ho Kim
Attorney, Agent, or Firm—Greenblum & Bernstein P.L.C.

[57] ABSTRACT

A voltage-controller is used for controlling a CCD (charge couple device) image sensor including an n-type semiconductor substrate and a p-type semiconductor layer formed on a main surface thereof. Charges stored in the layer are swept therefrom to the substrate in accordance with a differential potential therebetween. The voltage-controller comprises a pulse signal controlling circuit, for outputting driver signals to transfer signal charges from the image sensor, and for outputting a pulse voltage to the substrate. A power source is provided for supplying positive and negative voltages to the pulse signal controlling circuit through a first power line and a second power line to control the outputs thereof. A discharging circuit is provided in the second power line to selectively ground the same upon termination of the output of the negative voltage supplied from the power source.

7 Claims, 4 Drawing Sheets

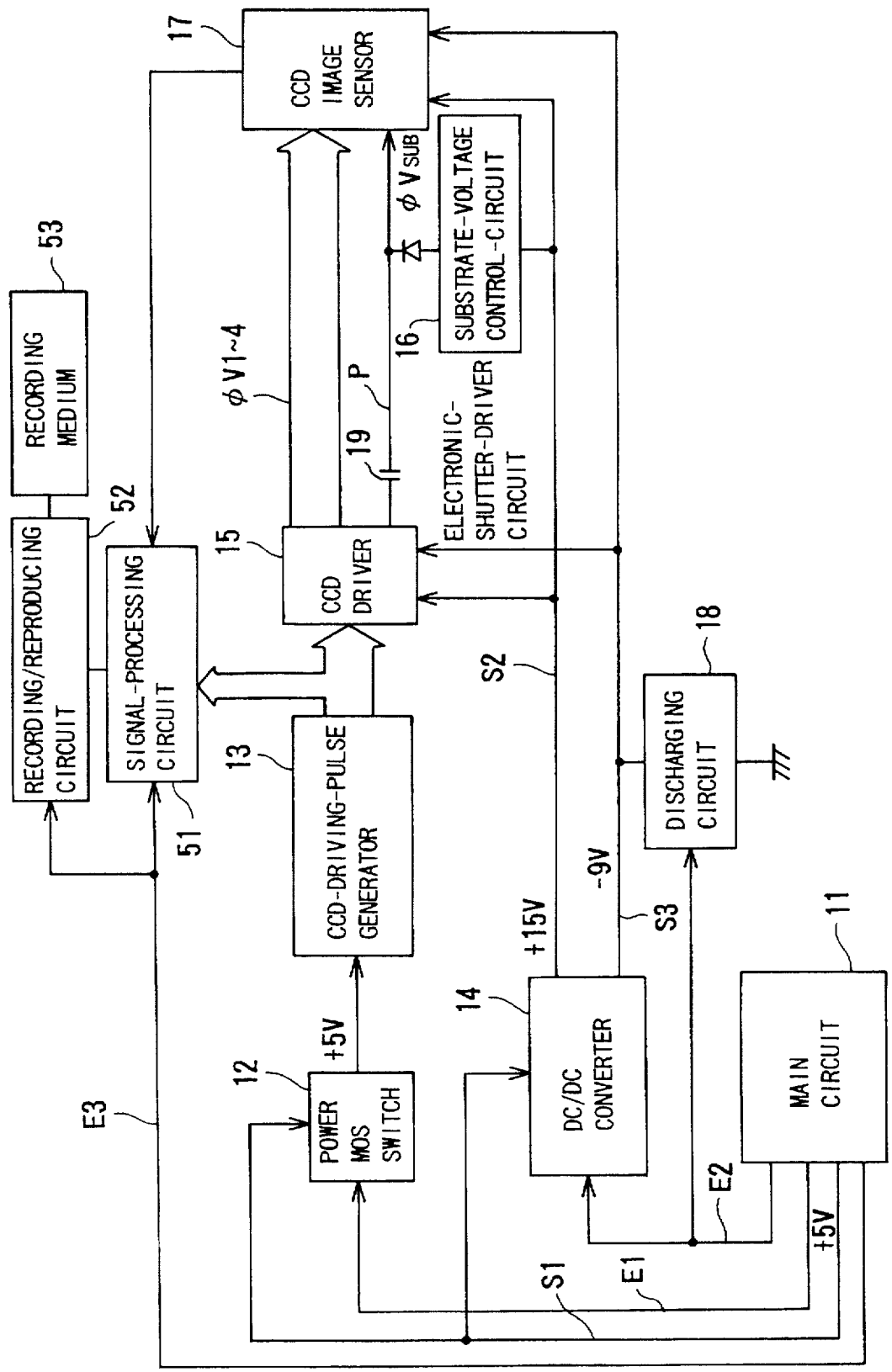

VOLTAGE CONTROLLER FOR CONTROLLING SOLID-STATE IMAGE SENSOR

This application is a continuation of application Ser. No. 08/480,328, filed Jun. 7, 1995, now abandoned.

BACKGROUND OF THE INVENTION

1. Field of the Invention

The present invention relates to a voltage-controller for controlling a solid-state image sensor such as a CCD (charge coupled device) image sensor which is, for example, incorporated in a bar code reader, an electronic still video camera, or the like.

2. Description of the Related Art

A conventional CCD image sensor comprises a first-type semiconductor substrate, such as an n-type semiconductor substrate, and a second-type semiconductor layer such as a p-type semiconductor layer. The p-type layer is grounded and formed on a main surface of the n-type semiconductor substrate, such that application of a positive voltage having a given voltage to the n-type semiconductor substrate sweeps useless charges from the p-type semiconductor layer to the n-type semiconductor substrate.

A CCD driver for driving the CCD image sensor requires two voltages which have polarities opposite to each other, and which greatly differ from a usual voltage (for example, +5 volts) utilized in general electronic circuits. Accordingly, a power source circuit (+5 volts) is connected to a voltage transformer, such as a DC-to-DC converter, which is connected to the CCD driver through a first power line and a second power line. For example, a voltage of +15 volts and a voltage of −9 volts are supplied from the DC-to-DC converter to the CCD driver through the first and second power lines, respectively.

On the other hand, a clock pulse generator, such as a CCD-driving-pulse generator which outputs clock pulses or timing pulses to the CCD driver, is connected to the power source circuit through a third power line through which the usual voltage (+5 volts) is supplied from the power source circuit to the CCD-driving-pulse generator. Thus, this voltage-controller requires first, second, and third power lines.

The CCD driver also includes an electronic-shutter-driver circuit which controls an electric charge accumulation in photodiodes of the CCD image sensor. In particular, the electronic-shutter-driver circuit is connected to the n-type semiconductor substrate through an electronic-shutter-pulse line. When an electronic-shutter-driving pulse output from the electronic-shutter-driver circuit is set to a high level, the electric charge accumulation in the photodiodes is commenced. When the electronic-shutter-driving pulse is set to a low level, the accumulation in the photodiodes is stopped. The accumulated electric charges, which correspond to signal charges stored in the photodiodes, are transferred from the CCD image sensor by means of drive pulses output from the CCD driver to the CCD image sensor through drive pulse lines. Thus, one image-sensing operation is completed.

Also, the electronic-shutter-pulse line is connected to a substrate-voltage control circuit to supply a given positive voltage (reverse bias voltage) to the n-type semiconductor substrate of the CCD image sensor during the transfer of the signal charges therefrom.

After the transfer of the signal charges from the CCD image sensor is completed, and prior to the next image-sensing operation, useless charges which have undesirably accumulated should be swept from the p-type semiconductor layer to the n-type semiconductor substrate. To this end, a pulse voltage is supplied from the electronic-shutter-driver circuit to the n-type semiconductor substrate, which is added to the voltage applied from the substrate-voltage control circuit to the n-type semiconductor substrate; this sweeps useless charges from the p-type semiconductor layer to the n-type semiconductor substrate.

After the sweep of the charges is completed, the supply of the voltages from the power source circuit to the various other circuits through the first, second, and third power lines is stopped. Then, the potentials of the first, second, and third power lines are discharged to return to the ground level. While discharging the first and third power lines can be carried out quickly, it takes a long period of time to discharge the second power line. This is because the second power line has a high input impedance due to the various circuits connected thereto. Thus, the potential of the second power line cannot reach the ground level quickly.

When an ON/OFF operation of the CCD image sensor is frequently repeated to reduce power consumption, i.e., where it is incorporated in a bar code reader, the supply of the voltage to the various circuits restart before the second power line discharges. Accordingly, the negative voltage remaining in the second power line is applied to the n-type semiconductor substrate; an electrical current thereby flows from the p-type semiconductor layer to the n-type semiconductor substrate, resulting in premature deterioration or breakage of the CCD image sensor.

SUMMARY OF THE INVENTION

Therefore, an object of the present invention is to provide a voltage-controller, for controlling a solid-state image sensor such as a CCD image sensor, which overcomes the above-mentioned drawbacks.

In accordance with the present invention, there is provided a voltage-controller for controlling a solid-state image sensor, including a first-type semiconductor substrate and a second-type semiconductor layer formed on a main surface thereof. Charges stored in the second-type semiconductor layer are swept therefrom to the first-type semiconductor substrate in accordance with a differential potential therebetween. The voltage-controller includes a pulse signal controlling device for outputting driver signals to the second-type semiconductor layer to transfer signal charges from the solid-state image sensor, and for outputting a pulse voltage to the first-type semiconductor substrate to sweep useless charges from the second-type semiconductor layer to the first-type semiconductor substrate. A power source supplies a given positive and negative voltage to the pulse signal controlling device through a first power line and a second power line to control the outputs of the pulse signal controlling device. A discharging mechanism provided in the second power line selectively grounds the same upon stopping the output of the negative voltage supplied from the power source therethrough.

Preferably, the discharging mechanism includes a discharging-time determining circuit by which the discharging-time of the second power line is determined. Also, the discharging mechanism preferably includes a current-restricting circuit for preventing the passage of any surge (excess) electric current through the discharging mechanism during the discharging. Further, the discharging mechanism may be controlled by an enabling signal that also controls the power source.

BRIEF DESCRIPTION OF THE DRAWINGS

The objects and advantages of the present invention will be better understood from the following description, with reference to the accompanying drawings in which:

FIG. 5 is another diagram of the voltage-controller for a CCD image sensor according to the present invention.

DESCRIPTION OF THE PREFERRED EMBODIMENTS

Figure 1:
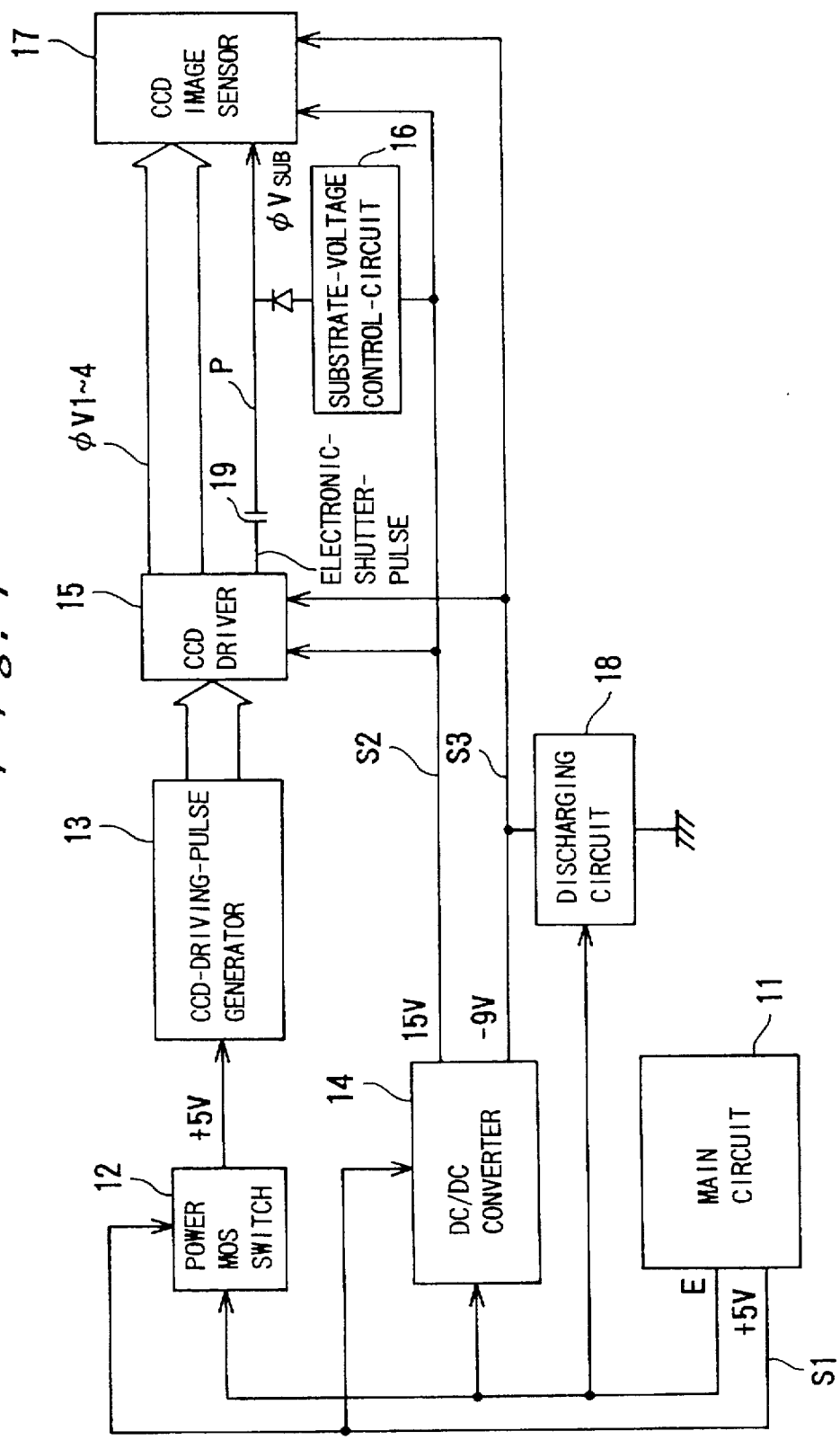
FIG. 1 is a block diagram of a voltage-controller for a CCD (charge coupled device) image sensor according to the present invention.
Figure 2:
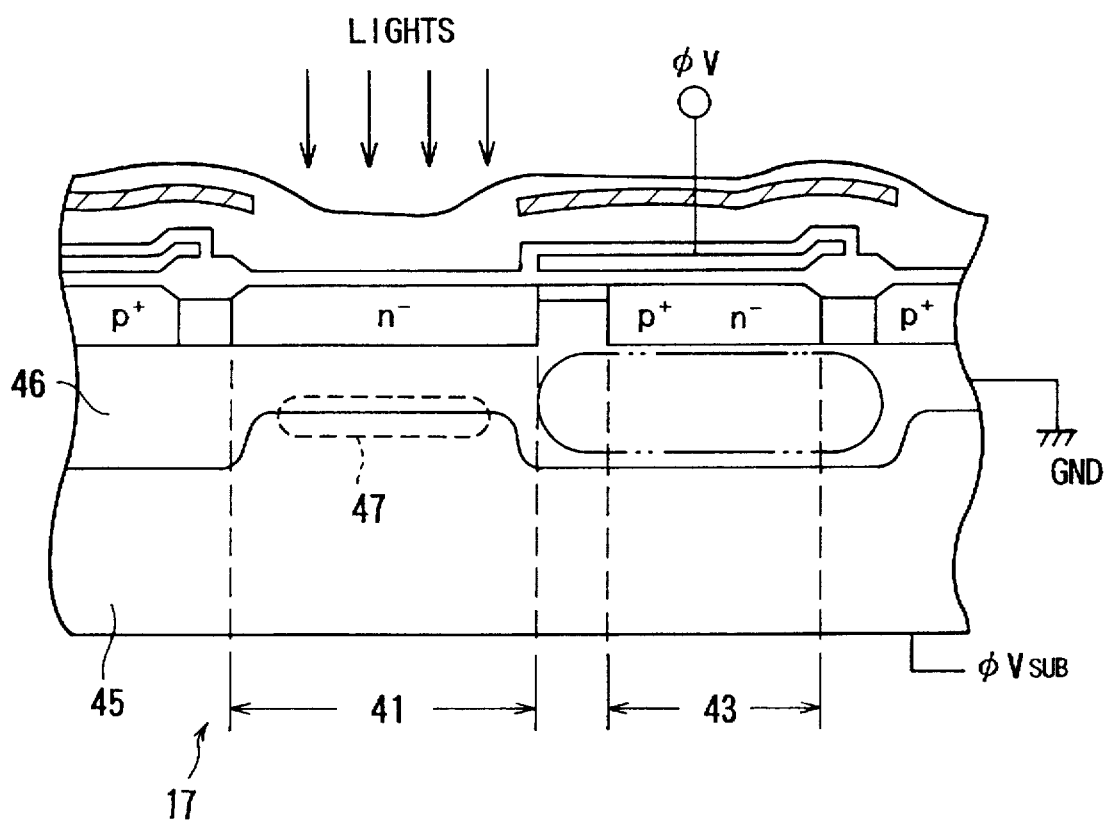
FIG. 2 is a cross-sectional view showing the CCD image sensor of FIG. 1 in detail.

FIG. 1 shows a block diagram of a voltage-controller according to the present invention, which is embodied in, for example, a CCD image sensor for a bar code reader (not shown). FIG. 2 shows a cross-sectional view of the CCD image sensor of FIG. 1.

The illustrated CCD image sensor, generally indicated by reference numeral 17, is one of the well-known types. In particular, the CCD image sensor 17 includes photodiodes 41, each of which produces and stores a signal-charge in accordance with the amount of received light. The signal-charges are transferred by a vertical transfer CCD 43 in a direction perpendicular to the plane of the drawing (FIG. 2). The CCD image sensor 17 also includes a first-type semiconductor substrate or (n-type semiconductor substrate in this embodiment) 45 which is connected to an electronic-shutter-pulse line P. A substrate voltage $\Phi V_{SUB}$ is applied to the n-type semiconductor substrate 45 through the electronic-shutter-pulse line P. Reference numeral 19 indicates a capacitor provided in the electronic-shutter-pulse line P. The CCD image sensor 17 also includes a second-type semiconductor layer or (p-type) semiconductor layer in this embodiment 46 formed on a main surface of the n-type semiconductor substrate 45, and the p-type semiconductor layer 46 is grounded to thereby maintain a potential thereof at the ground level.

A main circuit 11 outputs an enabling signal E to a power MOS switch 12, DC-to-DC converter 14, and a discharging circuit 18; the enabling signal E is changed from a high level "H" to a low level "L" and vice versa for controlling operations of these elements. For example, when the enabling signal E is maintained at the "H" level, the power MOS switch 12 and the DC-to-DC converter 14 are in such a condition so as to make an operation of the CCD image sensor 17 possible. The change of output of the enabling signal E is carried out in accordance with, for example, an ON/OFF operation of an actuating switch (not shown) of the bar code reader.

The power MOS switch 12 switches voltage to a CCD-driving-pulse generator 13. In particular, when the enabling signal E is switched to the "H" level, the power MOS switch 12 outputs a direct current voltage of +5 volts to the CCD-driving-pulse generator 13 by means of a direct current voltage (+5 volts) supplied from the main circuit 11 thereto through a power line S1.

The CCD-driving-pulse generator 13 outputs vertical-transfer-CCD timing pulses V1, V2, V3, and V4 (+5 volts), and an electronic-shutter-timing pulse $V_{SUB}$ (+5 volts), to a pulse signal controlling means such as a CCD driver 15. When the CCD driver 15 receives the timing pulses V1, V2, V3, and V4, it outputs drive pulses $\Phi V1$, $\Phi V2$, $\Phi V3$, and $\Phi V4$ to the CCD image sensor 17 for driving the vertical transfer CCD 43 thereof. When the CCD driver 15 receives the timing pulse $V_{SUB}$, an electronic-shutter-driver circuit 31 (FIG. 4) included in CCD driver 15 outputs an electronic-shutter-driving pulse SP. Also, the CCD-driving-pulse generator 13 directly outputs drive pulses to the CCD image sensor 17 for driving a horizontal transfer CCD thereof.

The DC-to-DC converter or power source circuit 14 converts the direct current voltage (+5 volts), output from the main circuit 11, into a direct current voltage of +15 volts, which is output (1) to the CCD driver 15, (2) a substrate-voltage control circuit 16, and (3) the CCD image sensor 17, all through a first power line S2. Also, the DC-to DC converter 14 converts the direct current voltage (+5 volts), output from the main circuit 11, into a direct current voltage of −9 volts, which is output to the CCD driver 15 and the CCD image sensor 17 through a second power line S3.

The substrate-voltage control circuit 16 serves to raise or lower the voltage of +15 volts supplied through the power line S2, and supplies a given voltage to the CCD image sensor 17 through the electronic-shutter-pulse line P.

The electronic-shutter-pulse line P is electrically connected to the n-type semiconductor substrate 45 of the CCD image sensor 17. The substrate voltage $\Phi V_{SUB}$ of the n-type semiconductor substrate 45 (FIG. 2) has a given positive potential which is determined by the electronic-shutter-driving pulse SP supplied thereto through the electronic-shutter-pulse line P and by a direct current voltage output from the substrate-voltage control circuit 16 thereto.

When the substrate voltage $\Phi V_{SUB}$ is applied to the n-type semiconductor substrate 45, the CCD image sensor 17 is allowed to transfer the signal charges therein. Namely, in the CCD image sensor 17, the transfer of the signal charges stored or accumulated in the photodiodes 41 is successively carried out in accordance with the outputs of the vertical transfer CCD driving pulses $\Phi V1$, $\Phi V2$, $\Phi V3$, and $\Phi V4$, and the outputs of the horizontal transfer CCD driving pulses.

Figure 3:
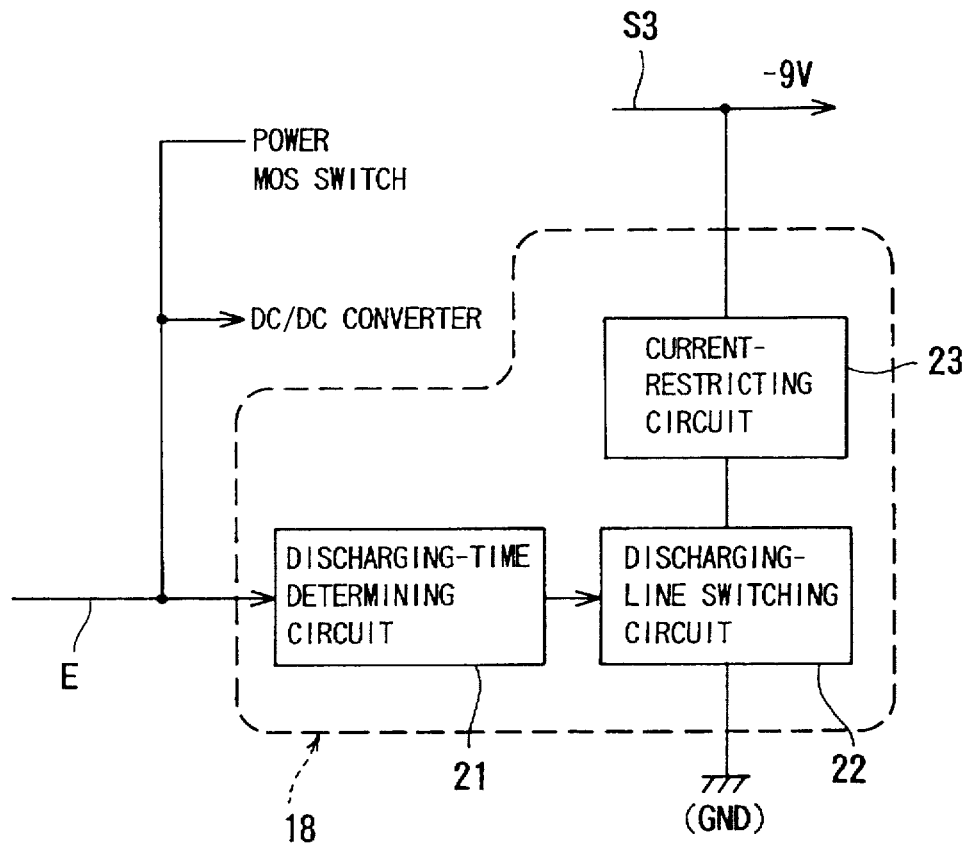
FIG. 3 is a block diagram showing the discharging circuit of FIG. 1 in detail.

FIG. 3 shows the discharging circuit 18 in detail. The discharging circuit 18 includes a discharging-time determining circuit 21, a discharging-line switching circuit 22, and a current-restricting circuit 23. The discharging-time determining circuit 21 controls the switching operation of the discharging-line switching circuit 22 in accordance with the change of the "H" and "L" levels of the enabling signal E. A first terminal of the discharging-line switching circuit 22 is grounded, and a second terminal thereof is connected to the current-restricting circuit 23, which is then connected to the power line S3. The current-restricting circuit 23 has a resistance by which the passage of a surge (excess) electric current through the discharging-line switching circuit 22 is prevented. The discharging-line switching circuit 22 establishes an electrical connection between the first terminal thereof and the current-restricting circuit 23 in accordance with a control operation of the discharging-time determining circuit 21.

Figure 4:
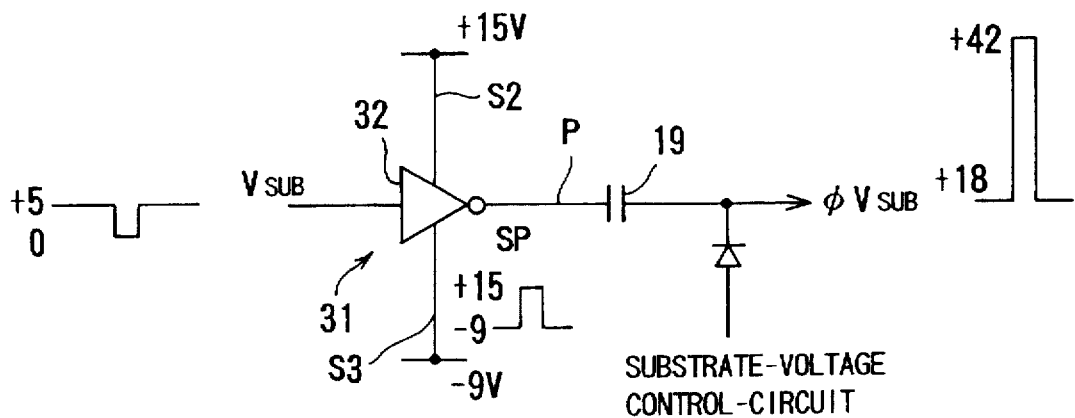
FIG. 4 is a circuit diagram showing an electronic-shutter-driver circuit included in the CCD driver of FIG. 1.

FIG. 4 shows the electronic-shutter-driver circuit 31 in detail, which is included in the CCD driver 15. The electronic-shutter-driver circuit 31 includes an inverter 32 having terminals which are connected to the power lines S2 and S3. The inverter 32 has an output terminal to which the electronic-shutter-pulse line P is connected. Note, the capacitor 19 serves to eliminate any direct current component of the electronic-shutter-driving pulse SP.

When the output of the CCD-driving-pulse generator 13 (i.e., the timing pulse $V_{SUB}$) is +5 volts, the inverter outputs the voltage of −9 volts, which is obtained from the power line 53. On the other hand, when the output of the CCD-driving-pulse generator 13 is changed from +5 volts to 0 volts, the inverter outputs the voltage of +15 volts (the electronic-shutter-driving pulse), which is obtained from the power line S2.

The electronic-shutter-driving pulse SP is not output from the inverter 32, i.e., when the output of the inverter 32 is −9 volts, the substrate-voltage control circuit 16 supplies a voltage of, for example, +18 volts as a substrate voltage to the n-type semiconductor substrate 45 of the CCD image sensor 17 through the electronic-shutter-pulse line P, without being affected by the output of the inverter 32 due to the existence of the capacitor 19.

Similarly, when the output of the inverter 32 is +15 volts, the inverter 32 supplies a voltage of +42 volts (+18 volts plus a differential potential of +24 between −9 volts and +15 volts) as a substrate voltage to the n-type semiconductor substrate 45 of the CCD image sensor 17 through the electronic-shutter-pulse line P. When the substrate voltage $\phi V_{SUB}$ of +42 volts is applied to the n-type semiconductor substrate 45, the useless charges are swept from the photodiodes to the n-type semiconductor substrate 45.

With reference to FIGS. 1 to 4, the operation of the voltage-controller according to the present invention will be explained below:

By switching "ON" a power switch (not shown) of the controller, the main circuit 11 supplies a direct current voltage of +5 volts to the power MOS switch 12 and the DC-to-DC converter 14 through the power line S1.

Then, when the actuating switch (not shown) of the image sensing device is turned ON, the output of the enabling signal E is changed from the "L" level to the "H" level, whereby the direct current voltage of +5 volts is supplied from the power MOS switch 12 to the CCD-driving-pulse generator 13. At this time, in the discharging circuit 18, the power line S3 is cut-off from the first or grounded terminal of the discharging-line switching circuit 22. Accordingly, the direct current voltage of −9 volts is supplied from the DC-to-DC converter 14 to the CCD driver 15 and the CCD image sensor 17. Simultaneously, the direct current voltage of +15 volts is supplied from the DC-to-DC converter 14 to the CCD driver 15, the CCD image sensor 17, and the substrate-voltage control circuit 16.

Subsequently, the voltage of −9 volts is output from the inverter 32 through the electronic-shutter-pulse line P. At this time, the substrate voltage $\phi V_{SUB}$ is determined as a constant positive potential (for example, +15 volts) according to a given constant direct current voltage output from the substrate-voltage control circuit 16.

At the beginning of a reading operation of the image sensing device (e.g., bar code reader), the output of the CCD-driving-pulse generator 13 (i.e., the timing pulse $V_{SUB}$) is changed from the level of +5 volts to 0 volts at a given time following a period of time which is necessary to sweep the useless charges from the photodiodes 41 to the n-type semiconductor substrate 45. In particular, the electronic-shutter-driving pulse SP of +15 volts is output from the inverter 32 through the electronic-shutter-pulse line P, and thus the n-type semiconductor substrate 45 is subjected to a voltage $\phi V_{SUB}$ of +42 volts through the electronic-shutter-pulse line P. The addition of the potential of the electronic-shutter-driving pulse SP sweeps the useless charges from the photodiode to the n-type semiconductor substrate 45.

When the sweep of the useless charges is completed, the output ($V_{SUB}$) of the CCD-driving-pulse generator 13 is changed from 0 volts to +5 volts, and thus the accumulation of signal charges in the photodiodes re-commences. Then, the signal charges are read out of the CCD image sensor 17 in accordance with the outputs of the vertical transfer CCD driving pulses $\Phi V1$, $\Phi V2$, $\Phi V3$, and $\Phi V4$, and the outputs of the horizontal transfer CCD driving pulses. The read-out signal charges are fed to an analog-signal-processing circuit (not shown) of the bar code reader.

When the reading-out of bar code data is completed by bar code reader, the output of the enabling signal E is changed from the "H" level to the "L" level, and thus the outputs of the power MOS switch 12 and DC-to-DC converter 14 are ended, thereby stopping the operation of the CCD-driving-pulse generator 13, CCD driver 15, substrate-voltage control circuit 16, and CCD image sensor 17.

On the other hand, when the output of the enabling signal E is changed from the "H" level to the "L" level, a control command signal is output from the discharging-time determining circuit 21 to the discharging-line switching circuit 22 in the discharge circuit 18, connecting the power line S3 to the first terminal of the discharging-line switching circuit 22 over a given period of time. Thus, the power line S3 is grounded through the current-restricting circuit 23, CCD image sensor 17 discharges.

During discharging, passage of a surge (excess) electric current through the discharging-line switching circuit 22 cannot occur due to the resistance provided in the current-restricting circuit 23. Thus, unwanted variation in the voltage in a part of the discharging circuit 18 connected to the ground is prevented.

Thus, the potential of the power line S3 quickly returns to the ground level because of the discharging. After a period of time (for example, about 0.6 seconds), which is necessary to discharge the power line S3, has elapsed, the discharging-line switching circuit 22 is turned OFF by a control demand signal output from the discharging-time determining circuit 21. Power line S3 is once again cut off from the first and grounded terminal of the discharging-line switching circuit 22.

In a conventional voltage-controller, although output of an enabling signal (E) is changed from a high level "H" to a low level "L" to discontinue the supply of voltages from a power MOS switch (12) and a DC-to-DC converter (14) to power lines (S2, S3), the potentials of the power lines (S2, S3) cannot quickly reach ground level (0 volts). This is especially true for power line (S3) which has a high input impedance due to the various circuits such as a CCD driver (15) and a CCD image sensor (17) provided therein.

For example, after about 30 seconds elapse after the outputs of the DC-to-DC converter (14) to the power lines (S2, S3) are stopped, the potential of the power line (S2) are substantially lowered to 0 volts. Nevertheless, the power line S3 may still have a potential of about −2 volts.

Under this condition, if the output of the enabling signal (E) is changed from the "L" level to the "H" level, and if the application of the direct current voltage of +5 volts from the power MOS switch (12) to the CCD-driving-pulse generator (13) is faster than the output of the direct current voltages from the DC-to-DC converter (14) through the power lines (S2, S3), then an electronic-shutter timing pulse $V_{SUB}$ (+5 volts) output from the CCD-driving-pulse generator (13) to the CCD driver (15). Next, since the voltage of −2 volts is applied to the negative terminal of inverter (32) of an electronic-shutter-driver circuit (31) included in the CCD driver (15), an electronic-shutter-driving pulse (SP) having a negative potential (for example, −2 volts) is output from the CCD driver (15) through an electronic-shutter-pulse line (P).

On the other hand, since a voltage is not still applied to a substrate-voltage control circuit (16) through the power line (S3), a constant positive voltage, which is necessary for controlling a substrate voltage $\Phi V_{SUB}$, cannot be supplied through the electronic-shutter-pulse line (P). Thus, the negative voltage is applied to an n-type semiconductor substrate (45). Due to the presence of a grounded p-type semiconductor layer formed on the n-type semiconductor substrate (45), an electric current flows from the p-type semiconductor layer to the n-type semiconductor substrate (45), resulting in a premature deterioration or breakage of the CCD image sensor (17).

In the conventional voltage-controller as mentioned above, if the supply of voltage through the power line (S2) is faster than the output of the electronic-shutter-timing pulse ($V_{SUB}$), the supply of the negative voltage from the substrate-voltage control circuit (16) to the n-type semiconductor substrate (45) can be prevented. Nevertheless, this approach is not expedient, because a delay circuit that would be necessary for ensuring the faster supply of voltage through the power line (S2) than the output of the timing pulse $V_{SUB}$ is complex and costly, resulting in a voltage-controller which is large, bulky and expensive.

As is apparent from the foregoing, according to the present invention, the discharging circuit 18 is connected to the power line S3, through which the negative voltage is supplied, and the discharging of the power line S3 is carried out over a given period of time just after the enabling signal (E) is changed from the "H" level to "L" level, whereby the potential of the power line S3 can quickly reach the ground level.

Accordingly, although the ON/OFF operation of the CCD image sensor is frequently repeated as in the case where it is incorporated into a bar code reader, a negative voltage is prevented from being applied to the n-type semiconductor substrate.

According to the embodiment as mentioned above, during the discharging of the power line S3, not only can the passage of any surge (excess) electric current through the discharging-line switching circuit 22 be prevented, but also the turbulance (or fluctuation) in the potential at the ground can be prevented, due to the current-restricting circuit 23 and the discharging-line switching circuit 22. The main circuit 11 is thereby protected.

FIG. 5 shows another embodiment of a voltage-controller according to the present invention, which is incorporated in an electronic photographing apparatus such as an electronic still video camera. Note, in FIG. 5, the same references as in FIG. 1 represent the same elements.

A signal-processing circuit 51 is provided for processing the signal charges obtained from the CCD image sensor 17, to thereby convert them into video signals, including luminance signals, differential color signals, etc. In photography or a recording operation, the video signals output from the signal-processing circuit 51 are subjected to a frequency-modulation (FM) process, and other process, at a recording/reproducing circuit 52, whereby the frequency-modulated image signals can be recorded as image data at a recording medium 53 in a given format such as the NTSC (National Television System Committee) format. During reproduction, the image data read from the recording medium 53 is processed by the recording/reproducing circuit 52, to thereby convert them into the image signals, and then the image signals are converted into the video signals including the luminance signals, differential color signals, etc. The signal-processing circuit 51 and the recording/reproducing circuit 52 are operated by an enabling signal E3 output from the main circuit 11.

The CCD-driving-pulse generator 13 outputs the timing pulses not only to the CCD driver 15 for driving the CCD image sensor 17, but also to the signal-processing circuit 51, whereby the signal charges successively output from the CCD image sensor 17 can be processed at the signal-processing circuit 51 with uniform timing.

In this embodiment, the two enabling signals E1 and E2 correspond to the previous enabling signal E. In particular, the enabling signal E1 is output from the main circuit 11 to the power MOS switch 12 for controlling an operation thereof, and the enabling signal E2 is output from the main circuit 11 to the DC-to-DC converter 14 and the discharging circuit 18 for controlling operations thereof.

In photography, the enabling signals E1 and E2 are simultaneously changed from the "L" level to the "H" level, and the power MOS switch 12, the DC-to-DC converter 14, and the discharging circuit 18 are operated in the same manner as in the first embodiment mentioned above, so that the signal charges are successively output from the CCD image sensor 17 to the signal-processing circuit 51. Then, the signal charges are successively processed in the signal-processing circuit 51 with the timing pulses output from the CCD-driving-pulse generator 13, to thereby produce the video signals which are output from the signal-processing circuit 51 to the recording/reproducing circuit 52. The video signals are processed at the recording/reproducing circuit 52 for recording by the recording medium 53, as mentioned above.

During reproduction, the image data read out of the recording medium 53 is converted into image signals at the recording/reproducing circuit 52, and the image signals are converted into video signals at the signal-processing circuit 51 on the basis of the timing signals output from the CCD-driving-pulse generator 13. Then, the video signals are output from the signal-processing circuit 51 to a monitor (not shown) for displaying images.

As is apparent from the foregoing, during reproduction, the CCD image sensor 17, the CCD driver 15, and the substrate-voltage control circuit 16 are not operated so as to reduce the consumption of electric power. Nevertheless, the CCD-driving-pulse generator 13 must be operated to supply the timing pulses to the signal-processing circuit 51. To this end, the enabling signal E1 is changed from the "L" level to the "H" level, whereas the enabling signal E2 is maintained at the "L" level. Accordingly, the direct current voltage of +15 volts and the direct current voltage of −9 volts cannot be output from the DC-to-DC converter through the power lines S2 and S3, and thus the CCD image sensor 17, the CCD driver 15, and the substrate-voltage control circuit 16 are not operated. On the other hand, the direct current voltage of +5 volts is output from the power MOS switch 12 to the CCD-driving-pulse generator 13, whereby the timing pulses are output from the CCD-driving-pulse generator 13 to the signal-processing circuit 51 and the CCD driver 15.

If a negative potential remains in the power line S3, and if the timing pulse $V_{SUB}$ having +5 volts is output to the CCD driver 15, a pulse signal having a negative potential is output through the electronic-shutter-pulse line P. Since the substrate-voltage control circuit 16 is not operated during reproduction, the substrate voltage $\Phi V_{SUB}$, having a negative potential, is applied to the n-type semiconductor substrate 45 of the CCD image sensor 17, resulting in a premature deterioration thereof. This is prone to occur when reproduction is commenced just after either photography or reproduction has been completed.

Nevertheless, according to the second embodiment as mentioned above, when either photography or reproducing ends, i.e., when the enabling signal E2 is changed from the "H" level to the "L" level, the charges of the n-type semiconductor substrate 45 are discharged through the power line S3 and the discharging circuit 18, and thus the potential of the n-type semiconductor substrate 45 is quickly returned to the ground level.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 6-152896 (filed on Jun. 10, 1994) and is expressly incorporated herein, by reference, in its entirety.

I claim:

1. A voltage-controller for controlling a solid-state image sensor, said image sensor including a first-type semiconductor substrate and a second-type semiconductor layer formed on a main surface of said image sensor, wherein charges stored in the second-type semiconductor layer are swept to the first-type semiconductor substrate in accordance with a differential potential between said substrate and said layer, said voltage-controller comprising:

pulse signal controlling means for outputting driver signals to said second-type semiconductor layer to output signal charges from said solid-state image sensor to a signal processor, said pulse signal controlling means also outputting a pulse voltage to said first-type semiconductor substrate, to sweep useless charges from said second-type semiconductor layer to said first-type semiconductor substrate;

a power source for supplying predetermined positive and negative voltages to said pulse signal controlling means through a first power line and a second power line to control outputs of said pulse signal controlling means; and discharge means, connected to said second power line, to selectively ground said second power line when said power source does not supply said negative voltage to said second power line.

2. A voltage-controller as set forth in claim 1, wherein said discharging means includes a discharging-time determining circuit which determines a discharging-time of said second power line.

3. A voltage-controller as set forth in claim 1, wherein said discharging means includes a current-restricting circuit for preventing passage of a surge electric current through the discharging means during discharging.

4. A voltage-controller as set forth in claim 1, wherein said discharging means and said power source are controlled by an enabling signal.

5. A voltage-controller for controlling a solid-state image sensor, comprising:

a driver circuit connected to said image sensor for driving said image sensor;

a power source circuit, connected to said image sensor and said driver circuit, and producing a positive voltage and a negative voltage to operate said driver circuit;

a control circuit for controlling operation of said driver circuit; and a discharging circuit for grounding a power line through which said negative voltage is supplied from said power source circuit to said image sensor, upon turning said power source circuit OFF.

6. A voltage-controller for controlling a solid-state image sensor, comprising:

a driver circuit connected to said image sensor for driving said image sensor;

a power source circuit, connected to said image sensor and said driver circuit, and producing a positive voltage and a negative voltage;

said power source circuit having a first power line connected to said image sensor and said driver circuit for supplying said positive voltage to said image sensor and said driver circuit, and a second power line connected to said image sensor and said driver circuit for supplying said negative voltage to said image sensor and said driver circuit; and a discharging circuit for selectively grounding said second power line of said power source circuit.

7. The voltage-controller of claim 6, wherein said second power line of said power source circuit is grounded by turning said power source circuit OFF.

* * * * *